United States Patent
Kroeger

(10) Patent No.: US 7,365,504 B2
(45) Date of Patent: Apr. 29, 2008

(54) MOTOR HAVING MULTIPLE INDEPENDENT ARMATURE WINDING SETS

(75) Inventor: John C. Kroeger, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 2 days.

(21) Appl. No.: 11/443,587

(22) Filed: May 30, 2006

(65) Prior Publication Data

US 2007/0278978 A1   Dec. 6, 2007

(51) Int. Cl.
*H02K 7/02* (2006.01)

(52) U.S. Cl. .................. 318/161; 318/34; 318/154; 388/800

(58) Field of Classification Search ............... 318/161, 318/34, 154; 388/800, 825; 180/65; 310/156
See application file for complete search history.

(56) References Cited

U.S. PATENT DOCUMENTS

| | | | |
|---|---|---|---|
| 4,071,742 A * | 1/1978 | Fleischer | 377/21 |
| 4,109,743 A * | 8/1978 | Brusaglino et al. | 180/65.4 |
| 4,319,333 A * | 3/1982 | Hedrick | 702/144 |
| 4,649,810 A * | 3/1987 | Wong | 99/326 |
| 5,397,975 A | 3/1995 | Syverson | |
| 5,424,595 A | 6/1995 | Preston et al. | |
| 5,502,368 A | 3/1996 | Syverson et al. | |
| 5,631,544 A | 5/1997 | Syverson et al. | |
| 5,656,922 A | 8/1997 | LaVelle et al. | |
| 5,661,381 A | 8/1997 | Blackburn | |
| 5,693,995 A | 12/1997 | Syverson | |
| 5,710,471 A | 1/1998 | Syverson et al. | |
| 5,747,909 A | 5/1998 | Syverson et al. | |
| 5,753,989 A | 5/1998 | Syverson et al. | |
| 5,825,115 A | 10/1998 | Kronenberg et al. | |
| 6,236,134 B1 | 5/2001 | Syverson | |
| 6,710,495 B2 | 3/2004 | Lipo et al. | |
| 6,838,802 B2 | 1/2005 | Tekawade | |
| 6,933,704 B2 | 8/2005 | Nelson et al. | |

* cited by examiner

*Primary Examiner*—Karen Masih
(74) *Attorney, Agent, or Firm*—Ingrassia Fisher & Lorenz

(57) ABSTRACT

A motor is provided that includes multiple sets of independent stator windings that are not magnetically coupled, which allows the motor to be driven by multiple independent current drivers, and thereby increases the overall torque generated by the motor. In one embodiment, the motor is a brushless DC motor that includes a rotor and a stator. The rotor is configured for rotation, and the stator surrounds at least a portion of the rotor and has multiple sets of independent stator windings wound thereon. Each set of independent stator windings is configured to be independently energized and, when energized, magnetically independent of the other sets of independent stator windings.

20 Claims, 5 Drawing Sheets

MOTOR HAVING MULTIPLE INDEPENDENT ARMATURE WINDING SETS

TECHNICAL FIELD

The present invention generally relates to electric motors and, more particularly, to an electric motor having multiple sets of independent armature windings that can be driven independently.

BACKGROUND

Many spacecraft, including satellites, include attitude control systems that are used to maneuver the spacecraft to a desired attitude. A typical attitude control system includes one or more control units, one or more sensors, and a plurality of reaction wheel assemblies (RWA). The sensors, which may include, for example, one or more sun sensors, earth sensors, and/or inertial sensors, determine actual spacecraft attitude and supplies signals representative of actual spacecraft attitude to the control unit. The control unit also receives attitude commands from either an on-board source or an external source, and determines whether an attitude adjustment needs to be made. If an attitude adjustment does indeed need to be made, the control unit supplies appropriate commands to the RWAs, which cause the rotational speed of the RWAs to either increase or decrease, thereby generating an appropriate torque that causes the spacecraft to move to the commanded attitude.

As is generally known, RWAs typically include a wheel mass, such as a flywheel, rotationally mounted within a housing that is coupled to the spacecraft structure, and a motor. The motor is typically implemented using a brushless DC motor. The speed of the motor is controlled via a motor control unit, which may be shared by one or more other RWAs or dedicated to a single RWA. In either case, the motor control unit receives commands supplied from the attitude control system control unit and, in response, controls the motor to either increase or decrease the rotational speed of the flywheel. The change in rotational speed of the flywheel results in a change in momentum. This change in momentum generates the torque that is supplied to the spacecraft. Although RWAs generally provide a safe, reliable, and cost effective way to generate spacecraft torques, presently known RWAs do suffer certain drawbacks. For example, presently known RWAs typically generate relatively low maximum torque magnitudes of, for example, about 1.5 Newton-meters (N-m) or less.

In some instances, it would be desirable to generate higher levels of torque from the RWA motor. To do so, the RWA could be implemented with multiple motors. This solution, however, could increase RWA cost and complexity. Alternatively, the current drivers that are used to supply current to the RWA motor could be redesigned to supply greater current magnitudes, or the bus voltage within the spacecraft could be increased. These latter alternatives may also be cost prohibitive, and therefore undesirable.

Hence, there is a need for the ability to generate relatively high levels of torque (e.g., greater than about 1.5 N-m) in an RWA from a single brushless DC motor, while utilizing readily available motor current drivers and/or without incurring the potential increased costs associated with changing spacecraft bus voltage magnitude. The present invention addresses at least this need.

BRIEF SUMMARY

A motor is provided that includes multiple sets of independent stator windings that are not magnetically coupled, which allows the motor to be driven by multiple independent current drivers, and thereby increases the overall torque generated by the motor. In one embodiment, and by way of example only, a brushless DC motor includes a rotor and a stator. The rotor is configured for rotation, and the stator surrounds at least a portion of the rotor and has multiple sets of independent stator windings wound thereon. Each set of independent stator windings is configured to be independently energized and, when energized, magnetically independent of the other sets of independent stator windings.

In another exemplary embodiment, a brushless DC motor system includes a rotor, a stator, and a plurality of independent motor drivers. The rotor is configured for rotation, and the stator surrounds at least a portion of the rotor and has multiple sets of independent stator windings wound thereon. Each set of independent stator windings is configured to be independently energized and, when energized, magnetically independent of the other sets of independent stator windings configured for rotation. Each motor driver is coupled to one of the sets of independent stator windings and is configured to selectively energize and commutate the set of independent stator windings to which it is coupled.

In yet a further exemplary embodiment, an attitude control system includes a plurality of rotationally mounted flywheels, a main control unit, a plurality of motor control units, and a plurality of motors. Each flywheel is adapted to receive a rotational drive force. The main control unit is adapted to receive torque commands and is operable, in response thereto, to selectively supply a plurality of independent speed commands. Each motor control unit is coupled to receive selected ones of the independent speed commands and, upon receipt thereof, to selectively supply a plurality of motor activation signals. Each motor is coupled to one of the flywheels to supply the rotational drive force thereto, and each motor includes a rotor and a stator. The stator surrounds at least a portion of the rotor and has multiple sets of independent stator windings wound thereon. Each set of independent stator windings is coupled to receive, and to be independently energized in response to, selected ones of the activation signals, and each set of independent stator windings is configured, upon being energized, to be magnetically independent of the other sets of independent stator windings.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description of the invention. In this regard, although the motor that is described herein is described as being implemented within a reaction wheel assembly (RWA), it will be appreciated that this is merely exemplary, and that the motor could be used in numerous and varied devices, systems, and contexts including, for example, control moment gyros (CMGs), and energy storage flywheel systems, just to name a few.

Figure 1:
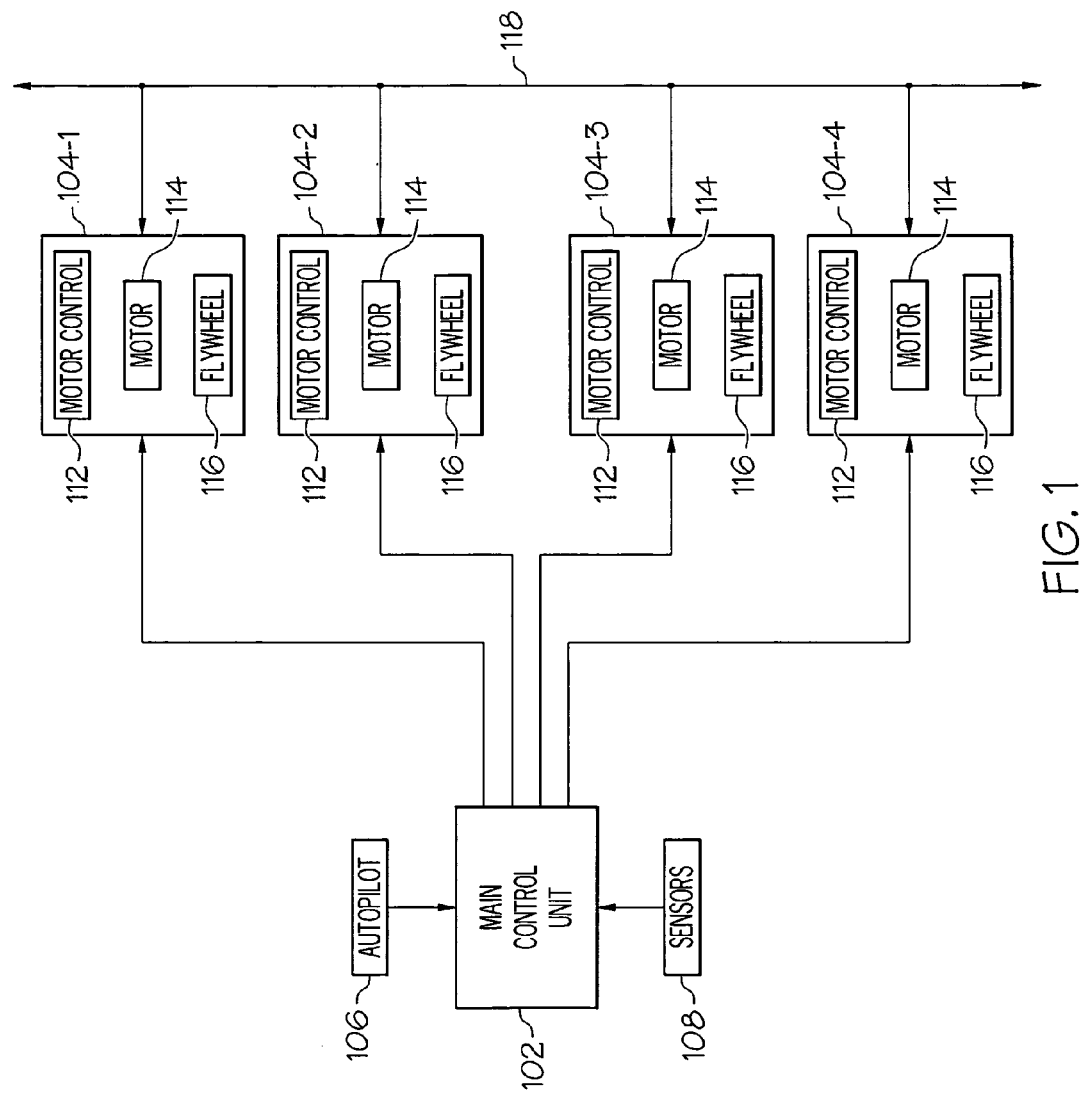
FIG. 1 is a functional block diagram of an exemplary attitude control system according to an embodiment of the present invention.

With the above in mind, and with reference first to FIG. 1, an exemplary attitude control system 100 is depicted, and includes a main control unit 102 and a plurality of reaction wheel assemblies (RWAs) 104 (e.g., 104-1, 104-2, 104-3, 104-4). The main controller 102 receives attitude commands (or torque commands) from, for example, an earthbound station or an onboard autopilot 106, and appropriately controls the operation of the RWAs 104. More specifically, the main control unit 102, in response to the torque commands, supplies speed commands to the RWAs 104. The supplied speed commands control the rotational speeds of the RWAs 104 to induce appropriate attitude disturbances in the spacecraft, and thereby control spacecraft attitude. One or more sensors 108, such as one or more inertial sensors, and/or one or more earth, sun, or star sensors, may additionally be included to sense spacecraft attitude and attitude rate-of-change, respectively, and supply feedback signals representative thereof to the main controller 102.

Figure 2:
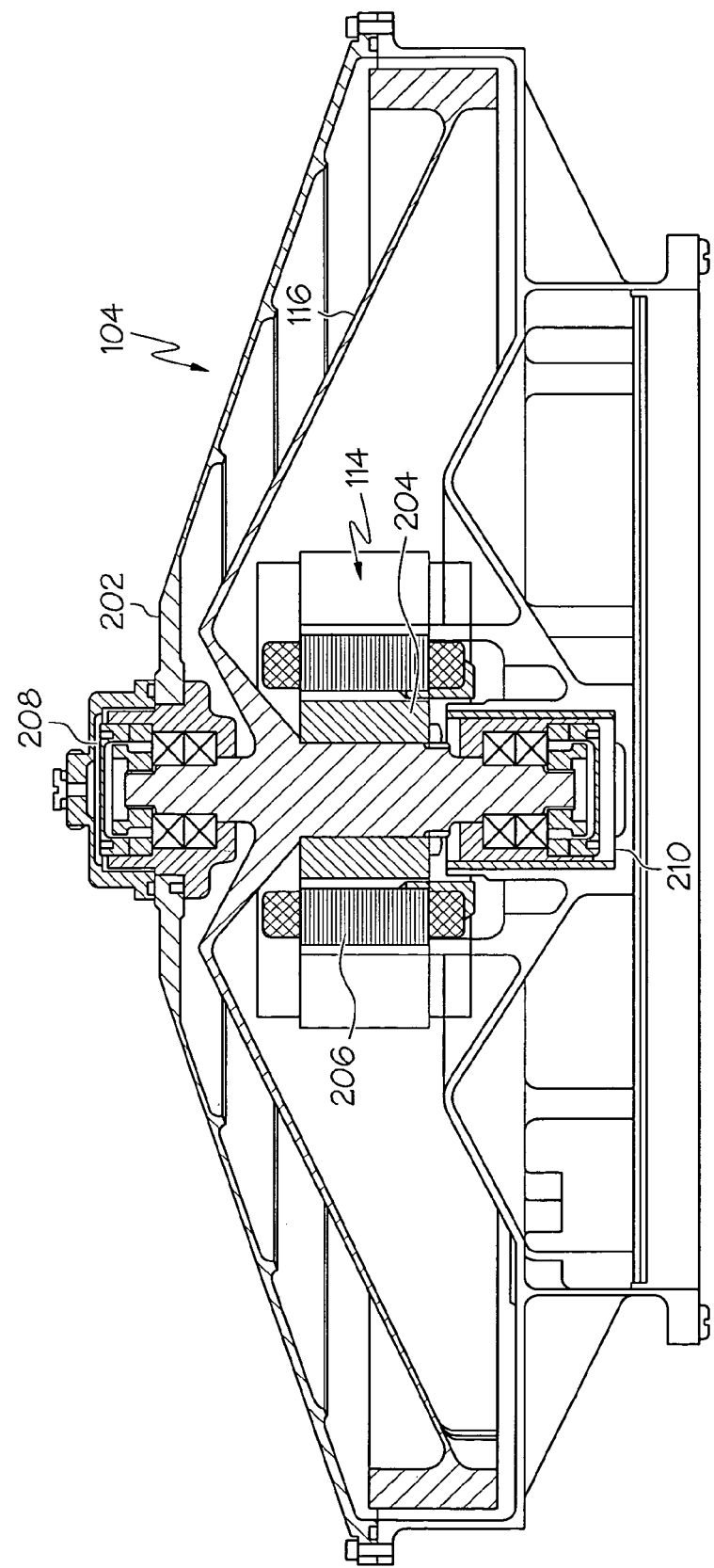
FIG. 2 depicts an exemplary reaction wheel assembly that may be used in the system of FIG. 1.

The RWAs 104 each include a motor control unit 112, a motor 114, and a flywheel 116. Each of the motor control units 112 receives the speed commands supplied thereto from the main control unit 102 and, in response, appropriately energizes its associated motor 114, from power supplied via a distribution bus 118, to rotate at the speed commanded by the main control unit 102. The motor 114, which is preferably implemented as a brushless DC motor, upon be appropriately energized from the distribution bus 118, drives the flywheel 116 at the commanded rotational speed. The change in rotational speed of the flywheel 116, as was noted previously, results in a change in momentum, which generates the torque that is supplied to the spacecraft. An exemplary embodiment of at least a portion of one of the RWAs 104 is depicted in FIG. 2 and, for completeness, will now be described.

The depicted RWA 104 includes the previously mentioned motor 114 and flywheel 116 disposed within a housing assembly 202. The motor 114 is mounted within the housing assembly 202 and includes a rotor 204 and a stator 206. The rotor 204 is coupled to the flywheel 116 and is configured, in response to electromagnetic excitation generated in the stator 206, to rotate the flywheel 116. The stator 206 surrounds at least a portion of, and preferably the entirety of, the rotor 204 and is coupled to be appropriately energized, under control of the motor control unit 112 (not depicted in FIG. 2), from the distribution bus 118 (not shown in FIG. 2). The flywheel 116 is rotationally mounted within the housing assembly 202 via an upper bearing assembly 208 and a lower bearing assembly 210. As just noted, the motor rotor 204 is coupled to the flywheel 116, and is thus driven thereby at the same rotational speed. Before proceeding further, it is noted that the motor control unit 112 associated with each RWA 104, which for clarity is not depicted in FIG. 2, could be disposed, partially or entirely, within the housing assembly 202 or external thereto.

The motor 114, as previously noted, is preferably implemented as a brushless DC motor. More specifically, the motor 114 is preferably implemented as a permanent magnet brushless DC motor that has multiple independent sets of windings wound on the stator 206. The independent sets of stator windings may be independently energized, via independent current drivers, and are configured, when energized, to be magnetically independent. In other words, the independent sets of stator windings, when energized, are not magnetically coupled to each other via, for example, transformer action. A more detailed description of exemplary embodiments of the motor 114 will now be described.

Figure 3:
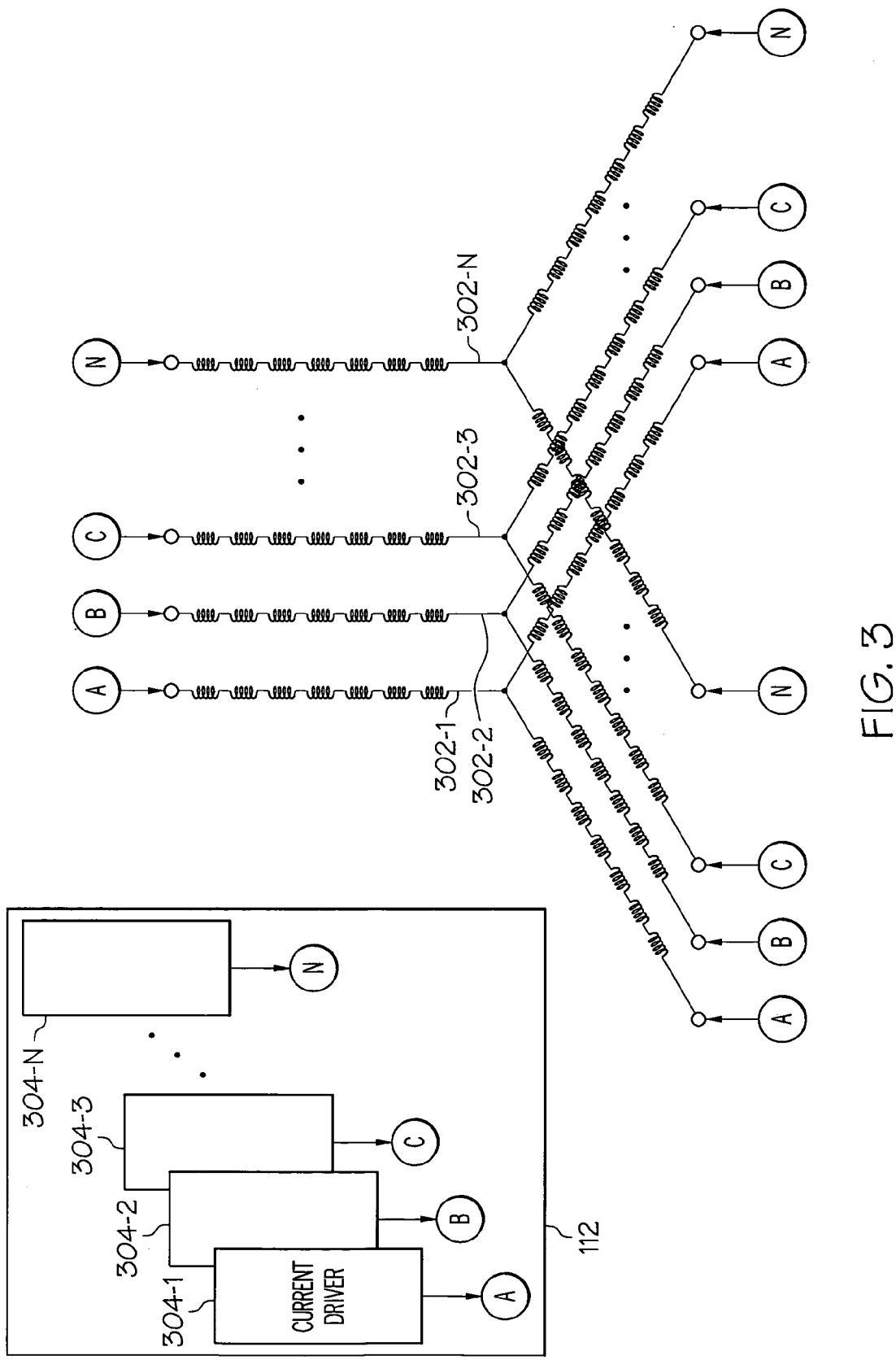
FIG. 3 depicts a schematic representation of an exemplary motor, according to an embodiment of the present invention, that may be used in the reaction wheel of FIG. 2.

In a particular preferred embodiment, the motor 114 is implemented as an 8-pole, 3-phase, Y-connected, permanent magnet brushless DC motor. It will be appreciated, however, that the motor 114 could be implemented with more or less than this number of poles, could alternatively be a Δ-connected, 3-phase motor, and/or could alternatively be implemented with other numbers of phases. As FIG. 3 illustrates schematically, and as was mentioned above, the stator 206 is implemented by winding multiple sets of independent stator windings 302 (e.g., 302-1, 302-2, 302-3, . . . 302-N) on a single stator core (not shown in FIG. 3). As was also mentioned above, and depicted in FIG. 3, each set of independent stator windings 302 is coupled to be selectively energized via an independent current driver 304 (304-1, 304-2, 304-3, . . . 304-N) that may, for example, form part of the previously described motor control unit 112. In any case, the motor 114 thus implements N-number of independent motors. It will be appreciated that the number of independent stator winding sets 302 that are wound on the single stator core, and thus the number independent motors that the motor 114 implements, may vary. In a particular preferred embodiment, however, three sets of independent stator windings 302 are wound on the stator core, to thereby implement three independent motors.

In a standard N-pole brushless DC motor, where N is an integer greater than one, the stator core is wound with the full complement of poles in all of the stator slots. However, with the motor 114 implemented herein each independent winding set 302 is wound in only a subset of the total number of stator slots. The number of stator slots in which each of the independent sets of stator windings 302 is may vary, and may depend, for example, on the particular number of independent stator winding sets 302 and the number of slots there are in the stator core. In a particular preferred embodiment, in which the motor 114 is implemented as a 3-phase, 8-pole brushless DC motor with three independent stator winding sets 302, the stator core includes 48 slots for the windings. The winding patterns that may be used to realize this particular implementation are depicted in FIGS. 4-7, and with reference thereto will now be described. Before doing so, however, it is noted that, for each independent stator winding set 302, one phase thereof (e.g., phase #1) is depicted using a solid line, a second phase thereof (e.g., phase #2) is depicted using a dashed line, and a third phase thereof (e.g., phase #3) is depicted using a dotted line. It is additionally noted that for clarity and ease of depiction, FIGS. 4 and 6, which depict all 48 of the stator core slots, only depict the outer coils that make up each phase of each stator winding set 302.

Figure 4:
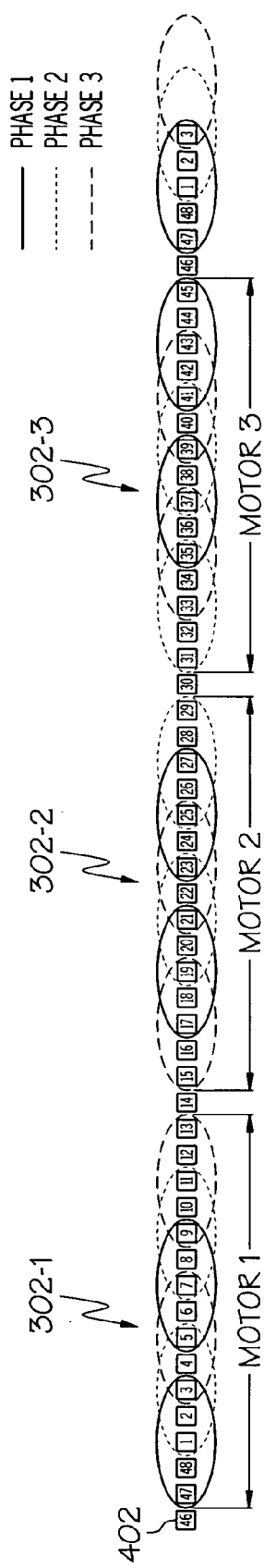
FIGS. 4-7 depict stator winding patterns that may be used to implement particular implementations of the motor that is generally depicted in FIG. 3.
Figure 5:
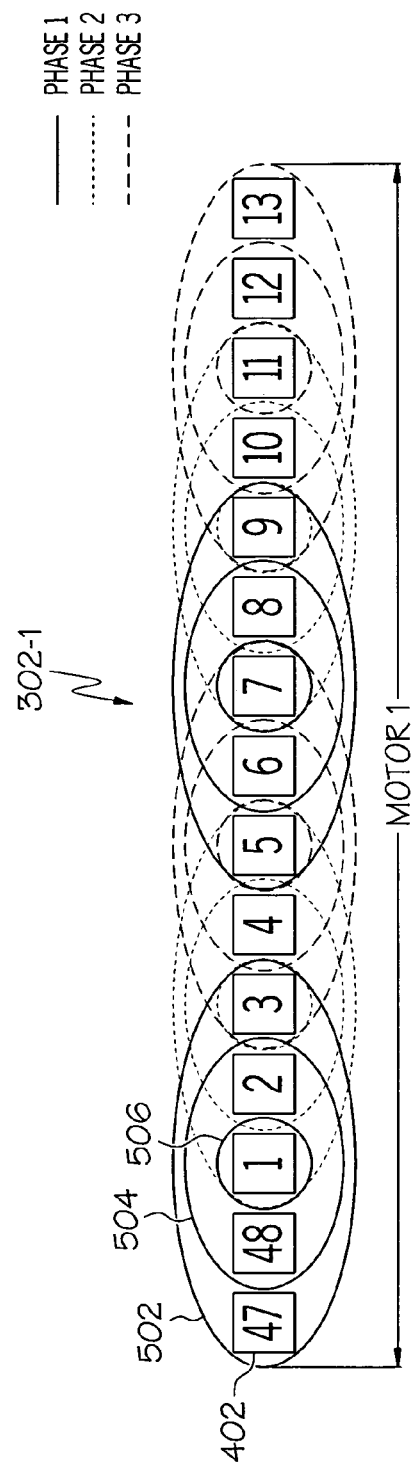

To implement a 3-phase, 8-pole brushless DC motor using a stator core 402 with 48 slots, each stator winding set 302 is wound in only 16 or 17 slots. The configuration in which each stator winding set 302 is wound in 16 slots is depicted in FIGS. 4 and 5, with FIG. 5 showing all three coils of each nested coil group. As shown therein, the winding pattern is implemented such that each independent stator winding set 302 is wound in a 3-phase configuration with 6 slots per pole. Moreover, and as is depicted most clearly in FIG. 5, the outer coils 502 of each stator winding set 302 are wound with a 5-slot pitch, whereas the nested coils of each set 302, which for convenience are referred to herein as the intermediate coils 504 and inner coils 506, are wound with a 3-slot pitch and a 1-slot pitch, respectively. It will be appreciated that for added clarity the nested coils 504, 506 are depicted for only one stator winding set 302 in FIG. 5.

Figure 6:
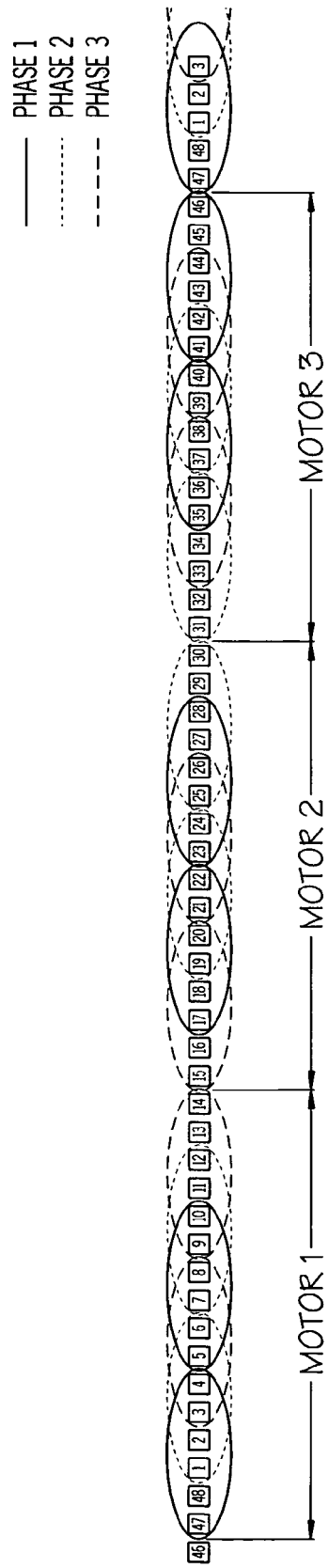
Figure 7:
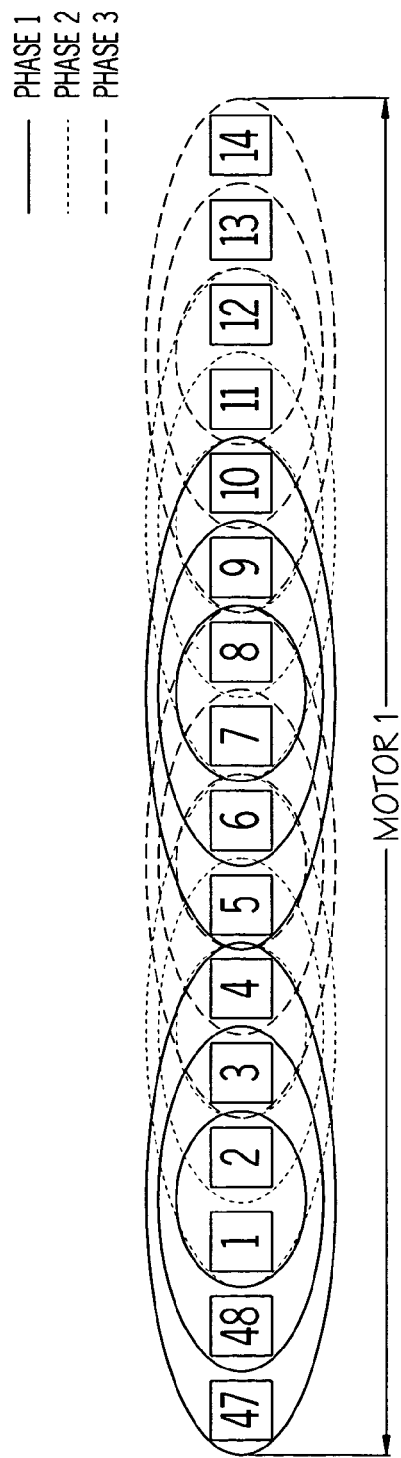

Turning now to FIGS. 6 and 7, the configuration in which each stator winding set 302 is wound in 17 slots is depicted. With this configuration, the winding pattern is again implemented such that each independent stator winding set 302 is wound in a 3-phase configuration, with 6 slots per pole. However, instead of being wound with a 5-slot pitch, the outer coils 502 of each stator winding set 302 are wound with a 6-slot pitch. Moreover, rather than being wound with a 3-slot pitch and 1-slot pitch, respectively, the nested coils 504, 506 of each stator winding set 302 are wound with a 4-slot pitch and a 2-slot pitch, respectively. Once again, for clarity the nested coils 504, 506 are depicted for only one stator winding set 302 in FIG. 7.

Both of the winding configurations described above and depicted in FIGS. 4-7 define two poles for each of the stator winding sets 302, but with the turns distribution of a standard 8-pole motor. Thus, as FIGS. 4-7 also depict, each stator winding set 302 defines an independent motor such that, when operated with an 8-pole permanent magnet rotor, either one, two, or all three stator winding sets 302 may be independently energized and commutated to generate a desired torque magnitude. The maximum torque magnitude that the motor 114 configured as described herein may generate will exceed the maximum torque magnitude of the standard motor of the same size, within currently known driver limitations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A brushless DC motor, comprising:
a rotor configured for rotation;
a stator surrounding at least a portion of the rotor and having multiple sets of independent multi-phase stator windings wound thereon, each set of independent multi-phase stator windings configured to be independently energized and wound such that, when energized, each set of independent multi-phase stator windings is magnetically independent of the other sets of independent multi-phase stator windings.

2. The motor of claim 1, wherein the rotor is a permanent magnet rotor.

3. The motor of claim 1, wherein each set of independent stator windings is wound on the stator in a three-phase winding configuration.

4. The motor of claim 3, wherein each set of independent stator windings is electrically connected in a Y-configuration.

5. The motor of claim 1, wherein:
the rotor is configured as an N-pole rotor, where N is an integer greater than one; and
each set of independent stator windings is wound on the stator to define M-number of poles, where M is an integer that is a factor of N.

6. The motor of claim 5, wherein N is equal to 8, and M is equal to 2.

7. The motor of claim 1, wherein:
the stator comprises a stator core having a total number of stator winding slots formed therein; and
each set of independent stator windings is wound in only a subset of the total number of stator winding slots.

8. The motor of claim 7, wherein:
the stator core has 48 stator winding slots formed therein; and
each set of independent stator windings is wound in either 16 or 17 of the stator winding slots.

9. The motor of claim 8, wherein:
each set of independent stator windings is wound in 16 of the stator winding slots
each set of independent stator windings includes an outer coil, an intermediate coil, and an inner coil;
the outer coil of each set is wound with a 5-slot pitch;
the intermediate coil of each set is wound with a 3-slot pitch; and
the inner coil of each set is wound with a 1-slot pitch.

10. The motor of claim 8, wherein:
each set of independent stator windings is wound in 17 of the stator winding slots
each set of independent stator windings includes an outer coil, an intermediate coil, and an inner coil;
the outer coil of each set is wound with a 6-slot pitch;
the intermediate coil of each set is wound with a 4-slot pitch; and
the inner coil of each set is wound with a 2-slot pitch.

11. A brushless DC motor system, comprising:
a rotor configured for rotation;
a stator surrounding at least a portion of the rotor and having multiple sets of independent multi-phase stator windings wound thereon, each set of independent multi-phase stator windings configured to be independently energized and wound such that, when energized, each set of independent multi-phase stator windings is magnetically independent of the other sets of independent multi-phase stator windings; and
a plurality of independent motor drivers, each motor driver coupled to one of the sets of independent stator windings and configured to selectively energize and commutate the set of independent stator windings to which it is coupled.

12. The system of claim 11, wherein the rotor is a permanent magnet rotor.

13. The system of claim 11, wherein each set of independent stator windings is wound on the stator in a three-phase winding configuration and electrically connected in a Y-configuration.

14. The system of claim 11, wherein:
the rotor is configured as an N-pole rotor, where N is an integer greater than one; and
each set of independent stator windings is wound on the stator to define M-number of poles, where M is an integer that is a factor of N.

15. The system of claim 14, wherein N is equal to 8, and M is equal to 2.

16. The motor of claim 11, wherein:
the stator comprises a stator core having a total number of stator winding slots formed therein; and
each set of independent stator windings is wound in only a subset of the total number of stator winding slots.

17. The system of claim 16, wherein:
the stator core has 48 stator winding slots formed therein; and
each set of independent stator windings is wound in either 16 or 17 of the stator winding slots.

18. The system of claim 17, wherein:
each set of independent stator windings is wound in 16 of the stator winding slots
each set of independent stator windings includes an outer coil, an intermediate coil, and an inner coil;
the outer coil of each set is wound with a 5-slot pitch;
the intermediate coil of each set is wound with a 3-slot pitch; and
the inner coil of each set is wound with a 1-slot pitch.

19. The system of claim 17, wherein:
each set of independent stator windings is wound in 17 of the stator winding slots
each set of independent stator windings includes an outer coil, an intermediate coil, and an inner coil;
the outer coil of each set is wound with a 6-slot pitch;
the intermediate coil of each set is wound with a 4-slot pitch; and
the inner coil of each set is wound with a 2-slot pitch.

20. An attitude control system, comprising:
a plurality of rotationally mounted flywheels, each flywheel adapted to receive a rotational drive force;
a main control unit adapted to receive torque commands and operable, in response thereto, to selectively supply a plurality of independent speed commands;
a plurality of motor control units, each motor control unit coupled to receive selected ones of the independent speed commands and, upon receipt thereof, to selectively supply a plurality of motor activation signals; and
a plurality of motors, each motor coupled to one of the flywheels to supply the rotational drive force thereto, each motor including:
a rotor, and
a stator surrounding at least a portion of the rotor and having multiple sets of independent multi-phase stator windings wound thereon, each set of independent multi-phase stator windings coupled to receive, and be independently energized in response to, selected ones of the activation signals, each set of independent multi-phase stator windings wound on the stator such that, upon being energized, each set of independent multi-phase stator windings is magnetically independent of the other sets of independent multi-phase stator windings.

* * * * *